(12) United States Patent
Liu et al.

(10) Patent No.: US 8,385,595 B2
(45) Date of Patent: Feb. 26, 2013

(54) MOTION DETECTION METHOD, APPARATUS AND SYSTEM

(75) Inventors: Wei Liu, Shandong (CN); Shuo Hu, Shandong (CN); Shao Liu, Shandong (CN)

(73) Assignee: Hisense Group Co., Ltd., Shandong (CN)

( * ) Notice: Subject to any disclaimer, the term of this patent is extended or adjusted under 35 U.S.C. 154(b) by 396 days.

(21) Appl. No.: 12/745,416

(22) PCT Filed: Dec. 2, 2009

(86) PCT No.: PCT/CN2009/075257
§ 371 (c)(1),
(2), (4) Date: May 28, 2010

(87) PCT Pub. No.: WO2010/124497
PCT Pub. Date: Nov. 4, 2010

(65) Prior Publication Data
US 2011/0044502 A1    Feb. 24, 2011

(30) Foreign Application Priority Data
Apr. 28, 2009   (CN) .......................... 2009 1 0135766

(51) Int. Cl.
*G06K 9/00* (2006.01)
(52) U.S. Cl. ....................................................... 382/103
(58) Field of Classification Search .................. None
See application file for complete search history.

(56) References Cited

U.S. PATENT DOCUMENTS

| | | | | |
|---|---|---|---|---|
| 6,658,136 B1 * | 12/2003 | Brumitt | .......................... | 382/103 |
| 6,661,918 B1 * | 12/2003 | Gordon et al. | ................. | 382/173 |
| 6,771,818 B1 * | 8/2004 | Krumm et al. | ................. | 382/225 |
| 7,139,409 B2 * | 11/2006 | Paragios et al. | ............... | 382/103 |
| 7,522,186 B2 * | 4/2009 | Arpa et al. | ..................... | 348/153 |

* cited by examiner

*Primary Examiner* — Tom Y Lu
(74) *Attorney, Agent, or Firm* — Nixon Peabody LLP; Jeffrey L. Costellia

(57) ABSTRACT

A motion detection method, apparatus and system are disclosed in the present invention, which relates to the video image processing field. The present invention can effectively overcome the influence of the background on motion detection and the problem of object "conglutination" to avoid false detection, thereby accomplishing object detection in complex scenes with a high precision. The motion detection method disclosed in embodiments of the present invention comprises: acquiring detection information of the background scene and detection information of the current scene, wherein the current scene is a scene comprising an object(s) to be detected and the same background scene; and calculating the object(s) to be detected according to the detection information of the background scene and the detection information of the current scene. The present invention is applicable to any scenes where moving objects need to be detected, e.g., automatic passenger flow statistical systems in railway, metro and bus sectors, and is particularly applicable to detection and calibration of objects in places where brightness varies greatly.

18 Claims, 6 Drawing Sheets

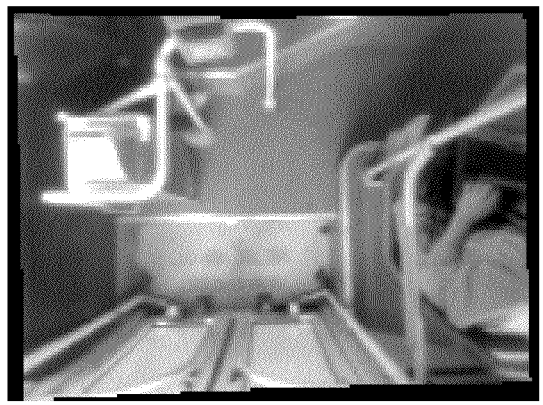 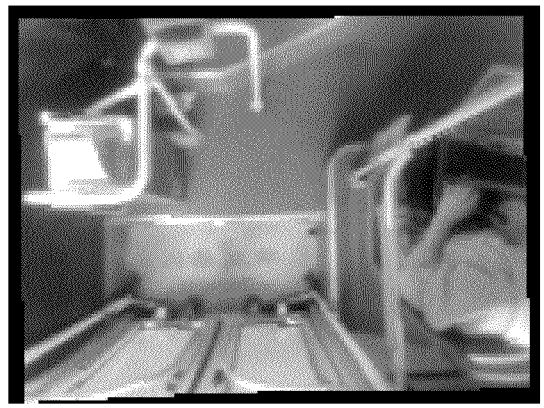
Fig. 4(a)　　　　　　　　　　　　Fig. 4(b)
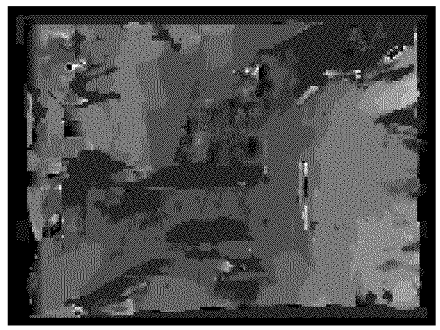
Fig. 4(c)

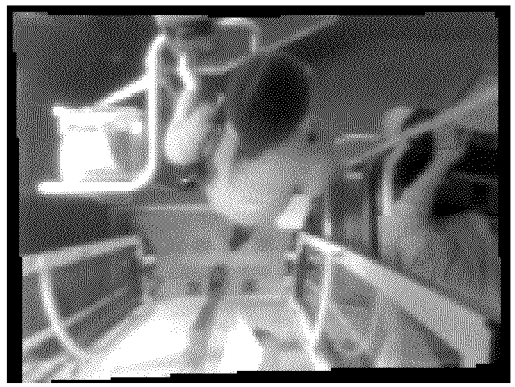 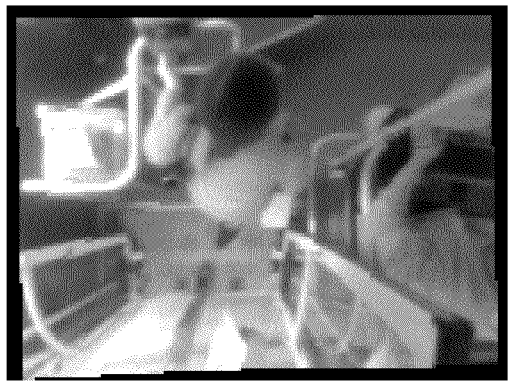
Fig. 4(d)          Fig. 4(e)
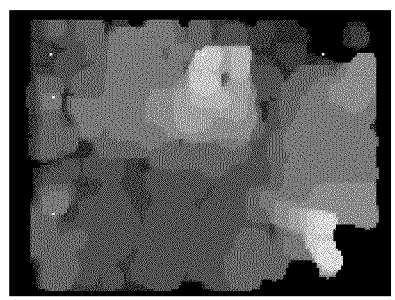
Fig. 4(f)
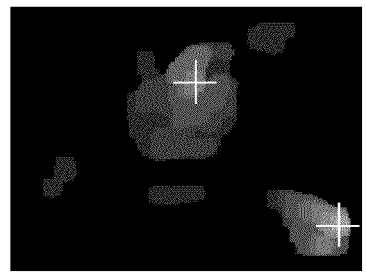
Fig. 5

MOTION DETECTION METHOD, APPARATUS AND SYSTEM

This application claims priority of China Patent Application No. 200910135766.X filed in China Intellectual Property Office on Apr. 28, 2009 and entitled "Motion Detection Method, Apparatus and System", which is incorporated herein by reference in its entirety.

BACKGROUND OF THE INVENTION

1. Technical Field

The present invention relates to the field of video image processing, and more particularly, to a motion detection method, a motion detection apparatus and a passenger flow detection system.

2. Description of Related Art

In public transportation systems such as railway systems, metro systems and bus systems, by using an automatic passenger flow information statistical system to collect details about the direction, time, volume and distribution of passenger flow in individual routes and stations, it will be made easier for operators to make adjustment on the routes and arrange vehicle resources reasonably.

A conventional method of automatically making statistics of passenger flow information adopts an infrared (IR) interruption system and a pressure sensing system. When an object passes through this system, the IR ray will be interrupted. Accordingly, by counting the number of objects passing through the IR interruption system, statistics of the passenger flow can be obtained. However, this method cannot make statistics on the passenger flow in an accurate and timely way, especially in rush hours when there is a very large passenger flow; moreover, sites where such a system can be used are limited.

In contrast, images can carry richer and a larger volume of information, and owing to emergence and development of image processing technologies, a lot of new solutions to the problems confronted by the conventional passenger flow statistical technologies have been provided.

Currently, most of image processing methods for automatically making statistics of passenger flow utilize methods of feature recognition and pattern matching etc. in two-dimensional image processing. However, such methods are only applicable to situations where the background is relatively simple and fail to make a correct recognition if there are side-by-side objects or objects are crowded in succession. Therefore, motion detection technologies based on stereovision have now become a hot topic of research.

A prior art I provides a bus passenger flow statistical method based on stereovision. Referring to China Patent No. CN200510060288.2, there is provided a method for making statistics of passenger flow, which detect heads of persons by detecting distances from individual points in a scene to be detected to a video camera based on the monocular image feature recognition technology. As shown in FIG. 1, when round-like objects are extracted from a monocular image, a lot of false round objects will be obtained; then by removing the false round objects based on some criteria, each of the remaining round objects will correspond to a head of a person so that, by counting the number of the round objects, statistics of the passenger flow can be made.

A prior art II provides a method for determining a moving object by use of a motion detection technology. Referring to China Patent No. CN200710003278.4, the method primarily comprises: acquiring a depth image of a scene detected, establishing and initializing a Gaussian background model of the depth image, and determining pixel points of the moving object in the depth image according to the Gaussian background model.

However, there are still some problems with the prior arts. As an example, the prior art I only uses the depth information of the scene containing the object to be detected and relies on the two-dimensional feature recognition technology as a primary means. The depth information can only assist in removing the false round objects but cannot result in complete removal of the false round objects, so this method suffers from poor detection accuracy, leading to an inaccurate statistical result of the passenger flow. The method provided in the prior art II also only uses the depth information of a scene containing the object to be detected and necessitates use of a number of Gaussian statistics and determination model equations, which represents a considerable computational complexity; moreover, this method requires timely update of the Gaussian background models by using an algorithm. Unfortunately, in case of a dense passenger flow, the background will fail to be updated, making it impossible to detect the objects. Furthermore, in case of a dense passenger flow, this method will cause "conglutination" of a plurality of objects, making it impossible to divide detection regions of these objects and to make statistics of the objects.

BRIEF SUMMARY OF THE INVENTION

To solve the problems of the prior art, a motion detection method, apparatus and system are provided in embodiments of the present invention to reduce computational complexity of motion detection and accomplish detection of an object(s) with high precision in a complex scene.

To achieve the aforesaid objective, the embodiments of the present invention adopt the following technical solutions.

In one aspect, an embodiment of the present invention provides a motion detection method, which comprises:

acquiring detection information of a background scene and detection information of a current scene, wherein the current scene is a scene comprising an object(s) to be detected and the same background scene;

calculating the object(s) to be detected according to the detection information of the background scene and the detection information of the current scene.

Further, the object(s) to be detected is calculated by subtracting the detection information of the background scene from the detection information of the current scene; or setting a first weight value, a second weight value and a compensation factor, subtracting a product of the detection information of the background scene and the second weight value from a product of the detection information of the current scene and the first weight value to obtain initial detection information of the object to be detected, and calculating the object(s) to be detected according to the initial detection information of the object to be detected and the compensation factor.

Further, the detection information is a disparity image, and the method further comprises:

acquiring a first image and a second image of the background scene and/or the current scene; extracting key points from the first image and the corresponding second image respectively to obtain first image key points and second image key points; performing stereo matching on the first image key points and the second image key points to obtain a matching point of each of the first image key point in the second image key points; calculating a disparity of each of the first image key points and acquiring a disparity image of the background scene and/or the current scene according to the disparity.

Further, the method also comprises:

acquiring key points within a predetermined range that starts from a $b^{th}$ column in an $a^{th}$ row of the second image towards the first image, wherein a and b are a row coordinate and a column coordinate of each of the key points in the first image respectively;

calculating matching values of the first image key point (a, b) and key points in the second image corresponding to the first image key point (a, b); and determining a matching point of the first image key point (a, b) in the second image according to the matching values.

Further, the method also comprises:

taking a scanning point next to the first image key point as a reference point according to a scanning sequence, wherein the key point and the reference point have row coordinates and column coordinates of (a, b) and (a, d) respectively in the first image;

acquiring a matching point of the reference point within a search range of the second image, wherein the search range is composed of a $(b-DIF)^{th}$ column to a $d^{th}$ column in the $a^{th}$ row, and DIF represents a disparity of the first image key point; and calculating a disparity between the reference point and the matching point of the reference point and taking the reference point as a key point.

Further, the method also comprises:

selecting a neighboring key point (o, p) corresponding to a non-key point (m, n) of the first image;

acquiring a matching point of the non-key point from a second search range of the second image, wherein the second search range is composed of a $(n-DIF)^{th}$ column to a $p^{th}$ column of a $m^{th}$ row, and DIF represents a disparity of the neighboring key point in the first image; and calculating a disparity between the non-key point and the matching point of the non-key point.

Further, the method also comprises:

extracting image edge point(s) from the first image and the second image respectively as the key points, the first image and the second image being binocular images of the scene; performing stereo matching between the first image key point and the second image key point based on the Census criterion; and acquiring the disparity image according to the disparity of the first image key point and based on the normalized cross correlation criterion.

Further, the detection information is a depth image, and the method also comprises:

calculating a depth image(s) of the background scene and/or the current scene according to the disparity image(s) of the background scene and/or the current scene acquired; or, performing an edge detection on images of the background scene or the current scene captured at a same view point; and calculating the depth image(s) of the background scene and/or the current scene according to the edge detection.

Further, obtaining the object to be detected further comprises: determining an initial object(s) to be detected, and determining a valid object(s) to be detected by removing false objects from the initial object(s) to be detected according to a falseness-removing strategy.

Further, the detection information is a disparity image or a depth image, and the method further comprises:

acquiring extreme points of a horizontal projection and a vertical projection respectively of the disparity/depth image of each of the objects; and pairing the extreme points of the horizontal projection and those of the vertical projection in one-to-one correspondence to determine the initial objects to be detected, wherein the disparity/depth image is calculated according to the detection information of the background scene and the detection information of the current scene.

The falseness-removing strategy comprises:

determining whether an average disparity/depth value within a predetermined window of the disparity/depth image centering around each of the initial objects to be detected is greater than a disparity/depth threshold; if the answer is yes, then the initial object to be detected is a valid object, and otherwise, the initial object to be detected is a false object; and for initial objects to be detected that haven't been subjected to the falseness-removing process, acquiring an object objPoint[maxN] that has the greatest average disparity/depth value within a predetermined window of the object disparity/depth image centering around the initial object to be detected, calculating an Euclidean distance of each of the initial objects to be detected from the object objPoint[maxN]; if the Euclidean distance of the initial object to be detected from the object objPoint[maxN] is no smaller than a distance threshold, then the initial object to be detected is a valid object to be detected, and otherwise, the initial object to be detected is a false object, wherein maxN is a serial No. of the object that has the greatest average disparity/depth value; and acquiring a minimum average gray-scale value of the initial objects to be detected within a predetermined window of the corresponding image of the current scene centering around the objects, and calculating a ratio of an average gray-scale value of each of the initial objects to be detected to the minimum average gray-scale value; if the ratio corresponding to the initial object to be detected is no greater than a ratio threshold and the average gray-scale value corresponding to the initial object to be detected is no greater than a control threshold, then the initial object to be detected is a valid object to be detected, and otherwise, the initial object to be detected is a false object.

In another aspect, an embodiment of the present invention provides a motion detection apparatus, which comprises:

a detection information acquisition unit, configured to acquire detection information of a background scene and detection information of a current scene, wherein the current scene is a scene comprising an object(s) to be detected and the same background scene;

an object detection unit, configured to calculate the object(s) to be detected according to the detection information of the background scene and the detection information of the current scene.

Further, the object detection unit is also configured to calculate the object(s) to be detected by subtracting the detection information of the background scene from the detection information of the current scene; or the object detection unit is also configured to set a first weight value, a second weight value and a compensation factor, subtract a product of the detection information of the background scene and the second weight value from a product of the detection information of the current scene and the first weight value to obtain initial detection information of the object to be detected, and calculate the object(s) to be detected according to the initial detection information of the object to be detected and the compensation factor.

Further, the detection information is a disparity image, and the detection information acquisition unit further comprises:

an image acquisition module, configured to acquire a first image and a second image of the background scene and/or the current scene;

a key point extracting module, configured to extract key points from the first image and the second image respectively to obtain first image key points and second image key points;

a key point matching module, configured to perform stereo matching on the first image key points and the second image key points to obtain a matching point of each of the first image key points in the second image key points; and a disparity image acquisition module, configured to calculate a disparity of each of the first image key points and acquire a disparity image of the background scene and/or the current scene according to the disparity.

Further, the detection information is a depth image, and the detection information acquisition unit comprises:

a first depth image calculation module, configured to calculate a depth image(s) of the background scene and/or the current scene according to the disparity image(s) of the background scene and/or the current scene acquired; or a second depth image calculation module, configured to perform an edge detection on images of the background scene and/or the current scene captured at a same view point; and calculate the depth image(s) of the background scene and/or the current scene according to the edge detection.

Further, the key point matching module is also configured to acquire key points within a predetermined range that starts from a $b^{th}$ column in an $a^{th}$ row of the second image towards the first image, wherein a and b are a row coordinate and a column coordinate of each of the key points in the first image respectively; calculate matching values of the first image key point (a, b) and key points in the second image corresponding to the first image key point (a, b); and determine a matching point of the first image key point (a, b) in the second image according to the matching values.

Further, the disparity image acquisition module comprises:

a reference point disparity acquisition module, configured to take a scanning point next to the first image key point as a reference point according to a scanning sequence, wherein the key point and the reference point have row coordinates and column coordinates of (a, b) and (a, d) respectively in the first image; acquire a matching point of the reference point within a search range of the second image, wherein the search range is composed of a $(b-DIF)^{th}$ column to a $d^{th}$ column in the $a^{th}$ row, and DIF represents a disparity of the first image key point; and calculate a disparity between the reference point and the matching point of the reference point and take the reference point as a key point; and a non-key point disparity acquisition module, configured to select a neighboring key point (o, p) corresponding to a non-key point (m, n) of the first image; acquire a matching point of the non-key point from a second search range of the second image, wherein the second search range is composed of a $(n-DIF)^{th}$ column to a $p^{th}$ column of a $m^{th}$ row, and DIF represents a disparity of the neighboring key point in the first image; and calculate a disparity between the non-key point and the matching point of the non-key point.

Further, the detection information is a disparity image or a depth image, and the object detection unit comprises:

an initial object acquisition module, configured to, from the object disparity/depth image calculated according to the detection information of the background scene and the detection information of the current scene, determine an initial object(s) to be detected;

an object validity distinguishing module, configured to determine a valid object(s) to be detected by removing false objects from the initial objects to be detected according to a falseness-removing strategy;

wherein, the falseness-removing strategy comprises:

determining whether an average disparity/depth value within a predetermined window of the disparity/depth image centering around each of the initial objects to be detected is greater than a disparity/depth threshold; if the answer is yes, then the initial object to be detected is a valid object, and otherwise, the initial object to be detected is a false object; and for initial objects to be detected that haven't been subjected to the falseness-removing process, acquiring an object objPoint[maxN] that has the greatest average disparity/depth value within a predetermined window of the object disparity/depth image centering around the initial object to be detected, calculating an Euclidean distance of each of the initial objects to be detected from the object objPoint[maxN]; if the Euclidean distance of the initial object to be detected from the object objPoint[maxN] is no smaller than a distance threshold, then the initial object to be detected is a valid object to be detected, and otherwise, the initial object to be detected is a false object, wherein maxN is a serial No. of the object that has the greatest average disparity/depth value; and acquiring a minimum average gray-scale value of the initial objects to be detected within a predetermined window of the corresponding image of the current scene centering around the objects, and calculating a ratio of an average gray-scale value of each of the initial objects to be detected to the minimum average gray-scale value; if the ratio corresponding to the initial object to be detected is no greater than a ratio threshold and the average gray-scale value corresponding to the initial object to be detected is no greater than a control threshold, then the initial object to be detected is a valid object to be detected, and otherwise, the initial object to be detected is a false object.

In a further aspect, an embodiment of the present invention provides a passenger flow detection system, which comprises a motion detection apparatus and a counter apparatus. The counter apparatus is configured to calculate a passenger flow volume according to objects to be detected that are acquired by the motion detection apparatus. The motion detection apparatus comprises:

a detection information acquisition unit, configured to acquire detection information of a background scene and detection information of a current scene, wherein the current scene comprises an object to be detected and the same background scene; and an object detection unit, configured to calculate the object to be detected according to the detection information of the background scene and the detection information of the current scene.

As can be known from the above description, the technical solutions disclosed by embodiments of the present invention take into account the influence of the original background on the object to be detected, and derive the object to be detected through calculation according to the detection information of the background scene and the detection information of the current scene. This effectively mitigates the influence of the background on detection of the object, resulting in an improved accuracy of detection. As has been proven in practice, the technical solutions disclosed by the embodiments of the present invention can solve the problems of the prior art caused by detecting an object only according to depth information of the scene containing the object to be detected, and effectively overcome the influence imposed by the background and the problem of object "conglutination", thereby accomplishing object detection in complex scenes with a high precision and a decreased computational complexity.

BRIEF DESCRIPTION OF THE SEVERAL VIEWS OF THE DRAWINGS

FIGS. 4(*a*) and 4(*b*) are binocular images of a background scene acquired in the second embodiment of the present invention;

FIG. 4(*c*) is a background disparity image acquired from FIGS. 4(*a*) and 4(*b*);

FIGS. 4(*d*) and 4(*e*) are binocular images of a current scene acquired in the second embodiment of the present invention;

FIG. 4(*f*) is a current disparity image acquired from FIGS. 4(*d*) and 4(*e*);

FIG. 5 is an object disparity image acquired from FIGS. 4(*c*) and 4(*f*);

DETAILED DESCRIPTION OF THE INVENTION

To illustrate technical solutions of the present invention more clearly, embodiments thereof will be described in detail hereinafter with reference to the attached drawings. However, the following description only presents some embodiments of the present invention, and other embodiments of the present invention may readily occur to those of ordinary skill in the art upon reviewing these embodiments without need to devoting any inventive efforts.

Figure 1:
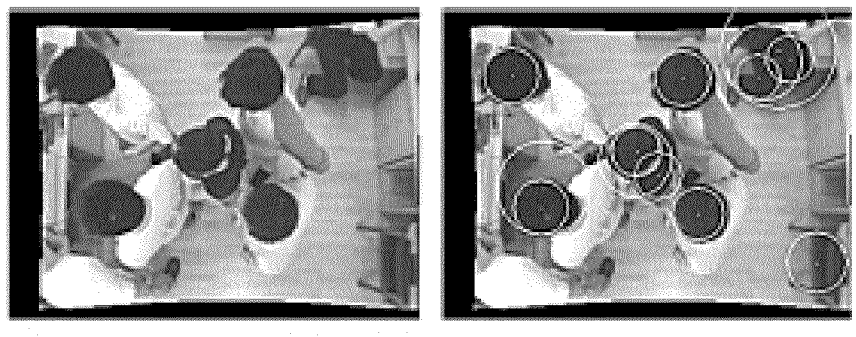
FIG. 1 a schematic view illustrating principles of locating a head in Prior Art I.
Figure 2:
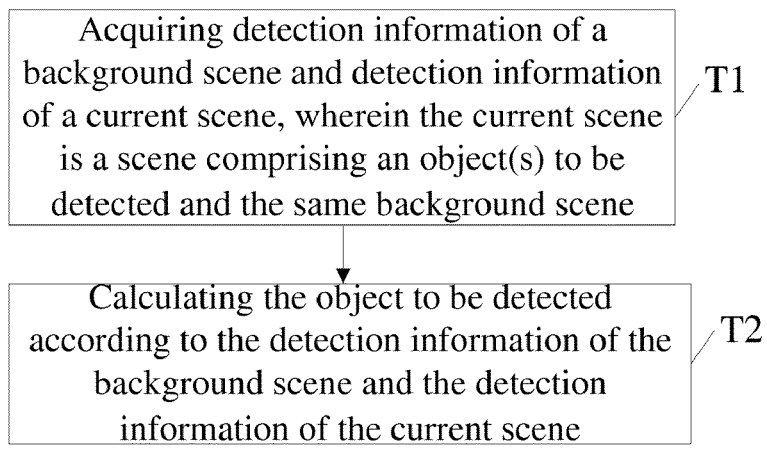
FIG. 2 is a schematic flowchart of a motion detection method according to a first embodiment of the present invention.

A first embodiment of the present invention provides a motion detection method. As shown in FIG. 2, the method comprises:

Step T1: acquiring detection information of a background scene and detection information of a current scene. The current scene is a scene comprising an object(s) to be detected and the same background scene. For example, in an automatic passenger flow statistical system, the background scene is a scene without containing any passengers, while the current scene is a scene containing a passenger flow.

Figure 3:
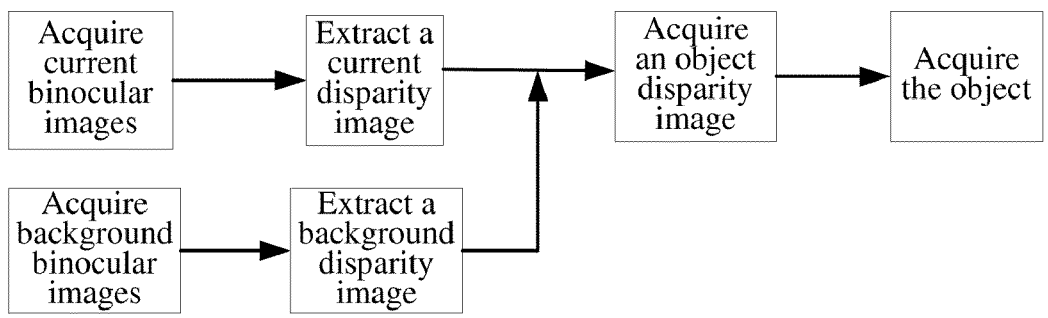
FIG. 3 is a schematic flowchart of a motion detection method according to a second embodiment of the present invention.

The detection information described above may be a disparity image or a depth image. In the first embodiment of the present invention, images at different view points may be used to calculate a disparity image. Referring to FIG. 3, firstly, a first image and a second image are acquired from the scene, one of which is a matching image and the other is a matched image. Then, a disparity image of the scene is acquired from the first image and the second image. There is no limitation on the way in which the first image and the second image are acquired. Preferably, binocular images of the scene are adopted, with background binocular images (e.g., a left image and a right image) being used as the first image and the second image of the background scene respectively and current binocular images of the current scene being used as the first image and the second image of the current scene respectively; however, the present invention is not limited thereto, and the first image and the second image of the scene may also be any images for obtaining a disparity image.

Binocular images are images of a scene acquired at different view angles by viewing the same scene from two or more view points according to the stereo recognition principle. For binocular images, a positional variation (i.e., disparity) between pixels of the left image and the right image can be calculated according to the triangulation principle. For example, the binocular images are captured by a binocular video camera. By means of the stereo matching technology, a background disparity image and a current disparity image can be acquired from the binocular images respectively.

The depth image of the scene may be acquired in various ways. For example, in an aspect of the first embodiment, a sequence of two-dimensional images of the scene may be acquired at a same view point (e.g., a sequence of monocular images of the scene may be captured by a monocular video camera), and by making an edge detection on the sequence of images, a depth image of the scene can be obtained directly through relevant calculation. In another aspect of the first embodiment, a disparity image may be calculated according to images of the scene at different view points, and then a corresponding depth image is derived, through calculation, from the disparity image.

Step T2: calculating the object to be detected according to the detection information of the background scene and the detection information of the current scene. This can be accomplished at least in the following two approaches:

the first approach: object detection information is obtained by subtracting the detection information of the background scene from the detection information of the current scene, and then the object to be detected is calculated according to the object detection information. For example, an object depth image is obtained by subtracting the depth image of the background scene from the depth image of the current scene, and then the object to be detected is calculated according to the object depth image; alternatively, an object disparity image is obtained by subtracting the disparity image of the background scene from the disparity image of the current scene, and then the object to be detected is calculated according to the object disparity image.

the second approach: a first weight value, a second weight value and a compensation factor are set; a product of the detection information of the background scene and the second weight value is subtracted from a product of the detection information of the current scene and the first weight value to obtain initial object detection information; and an object detection information is calculated based on the initial object detection information and the compensation factor, then the object to be detected is calculated according to the object detection information.

For example, the disparity image of the current scene is multiplied with the first weight value w1 to obtain a first product; the disparity image of the background scene is multiplied with the second weight value w2 to obtain a second product; the second product is subtracted from the first product to obtain an initial object disparity image; and then the compensation factor is added to or subtracted from the initial object disparity image to obtain the object disparity image.

Here, a same constant value may be set for weight values of a same disparity image, or different weight values may be set for different portions of the disparity image; the compensation factor may be added to or subtracted from the disparity image of the current scene or the background scene directly before the first product or the second product is obtained.

It shall be noted that, the weight values and the compensation factor are optional.

Optionally, a threshold is set, and the depth/disparity value of the object depth/disparity image obtained in either of the aforesaid two approaches is compared with the threshold. If the depth/disparity value is greater than the threshold, this point shall be kept in the object depth/disparity image; otherwise, this point shall be removed. Thus, the final object depth/disparity image is obtained.

In this way, interference of the background with the object detection is eliminated, resulting in object detection information containing only the object (e.g., containing only a passenger(s)), including the object disparity image or object depth image. Thus, accuracy of the detection is improved.

Then, the object can be located by using a projection of the object disparity image or object depth image. There is no limitation on which site of the object is to be located. For instance, if the object is a person, the locating site is not necessarily his or her head, but may also be other sites as long as the object can be located. Further, in order to remove the interfering points and extract a correct object, a falseness-removing process may be performed on objects obtained from the initial locating process.

The technical solution provided in this embodiment of the present invention takes into account the influence of the original background on the object to be detected, and derives the object to be detected through calculation according to the detection information of the background scene and the detection information of the current scene. This effectively mitigates the influence of the background on detection of the object, resulting in an improved accuracy of detection. As has been proven in practice, the technical solution provided in this embodiment of the present invention can solve the problems of the prior art caused by detecting an object only according to depth information of the scene containing the object to be detected, and effectively overcome the influence imposed by the background and the problem of object "conglutination", thereby accomplishing object detection in complex scenes with a high precision and a decreased computational complexity.

Hereinafter, a motion detection method according to a second embodiment of the present invention will be described in detail. In the second embodiment of the present invention, as shown in FIG. 3, an example in which a disparity image of the background scene and a disparity image of the current scene are obtained from images taken at different view points and then an object disparity image is used for object detection will be described to illustrate the technical solution of this embodiment.

Step S1: acquiring a background disparity image and a current disparity image. The background disparity image is a disparity image of the background scene, while the current disparity image is a disparity image comprising the object to be detected and the same background scene.

The disparity images are obtained from a first image and a second image.

Preferably, in the second embodiment of the present invention, binocular images are used to obtain the background disparity image and the current disparity image. Preferably, in the second embodiment of the present invention, a binocular video camera is used to capture the binocular images, i.e., a left image and a right image, in which the left image is chosen as a matched image (i.e., the first image) and the right image is chosen as a matching image (i.e., the second image). Between images of a same scene taken by the left video camera and the right video camera, a disparity will exist, i.e., displacement of the same objects in the horizontal direction will be seen in the two images; specifically, the further an object is from the video camera, the smaller the disparity of the object will be, and the nearer an object is from the video, the bigger the disparity of the object will be. Based on this principle, a parallel image can be extracted from the binocular images through stereo matching.

Stereo matching is known as the most difficult step in the stereovision processing process. In order to decrease the computational complexity, reduce the computational load and acquire an accurate disparity image so that the objects can be located accurately, a stereo matching approach based on key points is provided in this embodiment of the present invention.

Now, the stereo matching approach provided in the second embodiment of the present will be described. Specifically, this approach comprises the following steps:

Step S11: Selection of key points

Initially, key points are selected in the left image and the right image. A key point shall be a pixel point that has an obvious feature in the left image and the right image and can be correctly recognized and extracted in an easy way. The key points have an influence on subsequent stereo matching of other points in the images, so they must be selected properly. Considering that points having obvious features in an image are generally located at edges of an object(s), image edge points are preferably selected as key points in this embodiment of the present invention. Edges of the left image and the right image are extracted respectively, and extracted edge points are used as the key points. However, the present invention is not merely limited thereto, and other points having obvious features may also be selected as the key points or proper key points may be selected as desired.

Step S12: Stereo matching and disparity calculation of the key points

Once the key points are selected, stereo matching of the key points will be made at first to obtain matching points of the key points of the matched image in the matching image, which comprises: acquiring key points within a predetermined range that starts from a $b^{th}$ column in an $a^{th}$ row of the second image (i.e., the matching image) towards the first image (i.e., the matched image), wherein a and b are respectively a row coordinate and a column coordinate of the key point in the first image; calculating matching values of the first image key point (a, b) and key points in the second image corresponding to the first image key point (a, b); and determining a matching point of the first image key point (a, b) in the second image according to the matching values. The detailed processing is as follows:

Step S121: scanning row by row sequentially from left to right in the left image captured by the binocular video camera to search for any key point (hereinafter, edges points will be taken as an example). Here, it is assumed that an edge point A having coordinates (a, b) is found, wherein a is a row coordinate and b is a column coordinate.

Step S122: in the right image captured by the binocular video camera, a search is made for any key point within a predetermined range that starts from a $b^{th}$ column in the same row as point A (i.e., the $a^{th}$ row) towards the matched image. The predetermined range is a range containing a certain number N of pixel points, and depends on specific parameters and a installation height of the video camera. As an example, for an automatic bus passenger flow statistical system, N may be set to be 30.

That is, when the left image is a matched image, edge points are searched in a range containing 30 pixel points to the left side of the $b^{th}$ column in the $a^{th}$ row of the right image. Here, it is assumed that M edge points are found.

Step S123: Stereo matching is performed on the point A in the left image and the right image.

The edge points have obvious features and rich details, so during the process of stereo matching to obtain a matching point of the key point A in the second embodiment, a Census criterion that requires fewer computations are adopted in a 5×5 window to deliver a desirable effect.

That is, a Census value is calculated within a 5×5 window centering around the point A in the left image, and a Census value is calculated within a 5×5 window centering around each of the M edge points that are found in the right image. Then, the Census value of the point A is compared with each of the M Census values respectively to obtain a matching value. If the number of similar points (e.g., 25) is greater than a predetermined number (e.g., 20), then one of the M points in the right image that is most similar to the point A (i.e., that has the optimal matching value) is considered to match the point A; thus, a point B of coordinates (a, c) that matches the point A is obtained. Otherwise, if the number of similar points is smaller than the predetermined number, then the point A is removed from the key points.

Since the number (M) of points is small, and, consequently, the search range are relatively small and the Census matching criterion is relatively simple, the stereo matching of the key points can be accomplished at a high speed.

Step S124: If there is a matching point B of the key point A, then a disparity value DIF=b-c is calculated.

The above steps S121 to S124 are repeated to obtain disparity values of all the key points.

Step S13: Stereo matching of the reference point and disparity calculation

In order to perform stereo matching on the key point, a reference point C is established for the key point A and stereo matching is performed on the point C.

This comprises the following operations: taking a scanning point next to the first image key point as the reference point according to the scanning sequence, wherein the key point and the reference point have a row coordinate and a column coordinate of (a, b) and (a, d) respectively in the first image; acquiring a matching point of the reference point in a search range of the second image, wherein the search range is comprised of a (b-DIF)$^{th}$ column to a d$^{th}$ column of the a$^{th}$ row, and DIF represents a disparity of the first image key point; calculating a disparity between the reference point and the matching point thereof and set the reference point to be a key point. The detailed operations are as follows:

Step S131: Selection of the reference point

In the second embodiment of the present invention, a scanning point next to the key point A in the left image is selected as the reference point; i.e., a point immediately next to the right side of the key point A is selected as the reference point C. Here, coordinates of the reference point C are (a, d).

Then, a point next to the right side of the point C is selected as a reference point, and so on. This process is repeated until a next key point is found in this row. Operations with respect to individual rows are independent from and have no interference with each other.

Step S132: Stereo matching and disparity of the reference point

A matching point of the reference point is acquired in a search range of the matching image (i.e., the right image), wherein the search range is comprised of a (b-DIF)$^{th}$ column to a d$^{th}$ column of the a$^{th}$ row in the matching image and DIF represents a disparity of the key point in the matched image. In other words, a matching point of the point C is searched in a range from the (b-DIF)$^{th}$ column to the d$^{th}$ column of the same row (the a$^{th}$ row) as the point C. In this embodiment of the present invention, a normalized cross correlation criterion of a 7×7 window is used to acquire a matching point of the point C and calculate a disparity DIF_C of the point C. However, the present invention is not merely limited thereto, and other appropriate matching criteria may also be used.

Afterwards, the point C is taken as a key point to repeat the above operations in sequence. For example, immediately next to the right side of the point C(a, d) is a point D of coordinates (a, e). For the point D, the point C may be viewed as a key point thereof. If the point C has a disparity of DIF_C, then a matching point of D is searched in a range from a (d-DIF_C)$^{th}$ column to a e$^{th}$ column of the a$^{th}$ row in the right image. If there is a matching point, then a disparity DIF_D of the point D is calculated, and the point D is viewed as a key point; otherwise, if there is no matching point, then the point D is removed. This process is repeated to calculate disparity values of all points to the right side of the key point.

Step S14: Stereo matching of the non-key point and disparity calculation

The disparity of a non-key point is calculated as follows: selecting a neighboring key point (o, p) corresponding to the non-key point (m, n) in the first image; searching in a second search range of the second image for a matching point of the non-key point, wherein the second search range is comprised of a (n-DIF)$^{th}$ column to a p$^{th}$ column of the m$^{th}$ row and DIF represents a disparity of the neighboring key point in the first image; and calculating a disparity between the non-key point and the matching point of the non-key point.

Through operation of the steps S12 and S13, all points of which a disparity has been obtained in the left image can be viewed as key points, with the remaining points being viewed as non-key points. Key points are searched in rows to the left side of each non-key point, and in the same way as described in the step S13 (i.e., within a range in the same row of the matching image as the non-key point and in the columns determined by the disparity values of the key points found), stereo matching and disparity calculation of the non-key point are performed.

As can be seen from the above description, the stereo matching approach provided in the second embodiment divides the matching process into three primary stages: firstly, matching and disparity calculation of the key points are performed, which can deliver a desirable effect by use of a simple matching rule and a small window; then according to information of the key points and disparity values thereof, matching is performed on reference points around the key points; and finally, the remaining pixel points are processed. This approach significantly reduces the search range during the matching process, resulting in an improved matching speed.

As shown in FIGS. 4(a) to 4(f), images of a scene obtained when applying the abovementioned stereo matching approach to a automatic bus passenger flow statistical system are shown therein. FIGS. 4(a) and 4(b) are binocular images of a background scene, in which FIG. 4(a) is a left image and FIG. 4(b) is a right image. FIG. 4(c) is a background disparity image obtained. FIGS. 4(d) and 4(e) are binocular images of a current scene, in which FIG. 4(d) is a left image and FIG. 4(e) is a right image. FIG. 4(f) is a current disparity image obtained.

Step S2: Acquiring an object disparity image according to the background disparity image and the current disparity image An object disparity image is obtained by subtracting corresponding pixel values of the background disparity image from pixel values of the current disparity image on a pixel-by-pixel basis. Some interference points and disparity errors may exist in the object disparity image obtained through single subtraction operation, so the second embodiment of the present invention further comprises: setting a threshold; and comparing each of the pixel values obtained through the subtraction operation with the threshold. If the pixel value is greater than the threshold, the corresponding point will be kept in the object disparity image; otherwise, if the pixel value is smaller than the threshold, the pixel point will be removed, thus obtaining the final object disparity image. Referring to FIG. 5, the object disparity image obtained according to FIGS. 4(c) and 4(f) is shown therein.

Preferably, the object disparity image is obtained through direct subtraction operations in this embodiment, which practice, as proven by an experiment, can deliver a desirable effect. However, the present invention is not merely limited thereto; for example, the object disparity image may also be obtained in the second approach described in the step T2 of the first embodiment of in other similar or varied manners.

Step S3: Acquiring the object from the object disparity image, detailed operations of which are as follows:

Step S31: Acquiring extreme points in a horizontal projection and a vertical projection of the object disparity image respectively.

Here, an approach of acquiring a extreme point is provided: projecting the object disparity image along the horizontal direction (x-axis direction) and the vertical direction (y-axis direction) respectively to obtain two projection curves, namely, a horizontal projection curve xHist and a vertical projection curve yHist; calculating second differences of xHist and yHist respectively to obtain xHist extreme points xPeakPoint[n] (n∈[0, xNum], where n represents a serial No. of each extreme point and xNum represents the number of extreme points in xHist) and obtain yHist extreme points yPeakPoint[n] (n∈[0, yNum], where n represents a serial No. of each extreme point and yNum represents the number of extreme points in yHist).

Step S32: Acquiring the initial object according to the extreme points.

By pairing the xPeakPoint[n] and yPeakPoint[n] in one-to-one correspondence, xNum×yNum intial object points can be obtained. The initial object points may be expressed as objPoint[n], n∈[0, objNum].

The number of initial object points to be detected is objNum=xNum×yNum, and a position of each initial object objPoint[n] is labeled by xPeakPoint[n] and yPeakPoint[n].

For the abovementioned approach of using extreme points to label a position of an object, the position to be labeled is not limited to a specific site (e.g., a head) of the object, but may be any site as long as the object can be located. This enables detection of the object to be not limited to matching of a certain graphic (e.g., a round shape), thus improving accuracy of the object detection.

Then, according to the falseness-removing strategy, false objects are removed from the initial objects to obtain final valid objects.

Step S33: Removing false objects from the initial objects according to the falseness-removing strategy to determine valid objects.

Hereinafter, the approach of determining a valid object by removing false objects according to the second embodiment will be described.

In the falseness-removing process, three strategies are mainly adopted: (1) Disparity image information falseness-removing strategy, (2) Euclidean distance falseness-removing strategy, and (3) original-image gray-scale information falseness-removing strategy, all of which will be described as follows.

1. Disparity Image Information Falseness-Removing Strategy

Since real objects in the disparity image have relatively large disparity values, some interfering objects may be removed according to disparity values of initial objects to be detected in the disparity image. A threshold (deepThreshold) is set, for example, to be ½ of an average value of all disparity values in the disparity image. It is determined whether an average disparity value within a predetermined window of the object disparity image centering around the initial object is greater than the disparity threshold. If the answer is yes, then the initial object to be detected is a valid object; otherwise, the initial object to be detected is a false object. There is no limitation on the size of the predetermined window; for example, it may be a 5×5 window or a 7×7 window.

In this embodiment, reference C codes for obtaining the threshold are shown as follows:

```
int i,j;//loop variable
double sumTmp;//temperory variable
double deepThreshold;//threshold
sumTmp = 0;
for( i = 0; i < height; i++)
{
    for( j = 0; j < width; j++)
    { sumTmp = sumTmp + imgData[ i * width + j];}
}
deepThreshold = sumTmp/(width * height * 2);// the threshold
is equal to a half of the average disparity value
``` wherein, the array imgData represents the object disparity image data, and width and height represent the width and height of the image respectively.

In the second embodiment, the reference C codes for accomplishing disparity image information falseness-removing are shown as follows.

Let avgRegion[n] be an average disparity value of the initial object point to be detected objPoint[n] within a 5×5 window, and n be a serial No. of the object point to be detected. Then, the reference C codes are shown as follows:

```
double tmpSum = 0;
for( i = objPoint[n].y − 5; i < objPoint[n].y + 5; i++)
{
for( j = objPoint[n].x − 5; j < objPoint[n].x + 5; j++)
{tmpSum += imgData[i * width + j];}
}
avgRegion[n] = tmpSum /( 10 * 10);
``` wherein, the array imgData represents the disparity image data, width represents the width of the image, and objPoint[n].x and objPoint[n].y represents the row and column coordinates of the point objPoint[n] respectively.

If avgRegion[n] is greater than deepThreshold, then the point objPoint[n] is a valid object; otherwise, if avgRegion[n] is no greater than deepThreshold, the point objPoint[n] is a false object and is deleted.

2. Euclidean Distance Falseness-Removing Strategy

Because a distance between objects (e.g., heads of persons) shall not be less than a certain distance, interfering points can be eliminated according to distances between objects.

For initial objects that have not been subjected to the falseness-removing process, an object objPoint[maxN] that has the greatest average disparity value within a predetermined window of the object disparity image centering around the initial object to be detected is obtained, and an Euclidean distance of each of the initial objects to be detected from the object objPoint[maxN] is calculated. If the Euclidean distance of the initial object to be detected from the object objPoint[maxN] is no less than a distance threshold, then the initial object to be detected is a valid object; otherwise, the initial object to be detected is a false object. Here, maxN is a serial No. of the object that has the greatest average disparity value.

The above process is repeated until the Euclidean distance falseness-removing process has been performed on all the initial objects to be detected. Hereinafter, a specific implementation will be described as an example.

Let avgRegion[n] be an average disparity value of the initial object point to be detected objPoint[n] in a predetermined window (e.g., a 5×5 window), and n be a serial No. of the initial object point to be detected. The way in which avgRegion[n] is obtained is as described above in the section of "Disparity image information falseness-removing strategy".

To facilitate the distance falseness-removing process, optionally, a flag (e.g., a flag processFlag[n]) is set to indicate whether the initial object point to be detected has been subjected to the distance falseness-removing process. The flag processFlag[n] has an initial value of 0, and after the initial object to be detected has been subjected to the distance falseness-removing process, the flag processFlag[n] is set to be 1. Optionally, a deletion flag (e.g., a flag deleteFlag[n]) is set for the initial object point to be detected. The flag deleteFlag[n] has an initial value of 0, and if it is set to be 1, it means that this object point has been deleted. However, the present invention is not merely limited thereto, and other appropriate ways may be adopted to accomplish the aforementioned distance falseness-removing operation.

Figure 6:
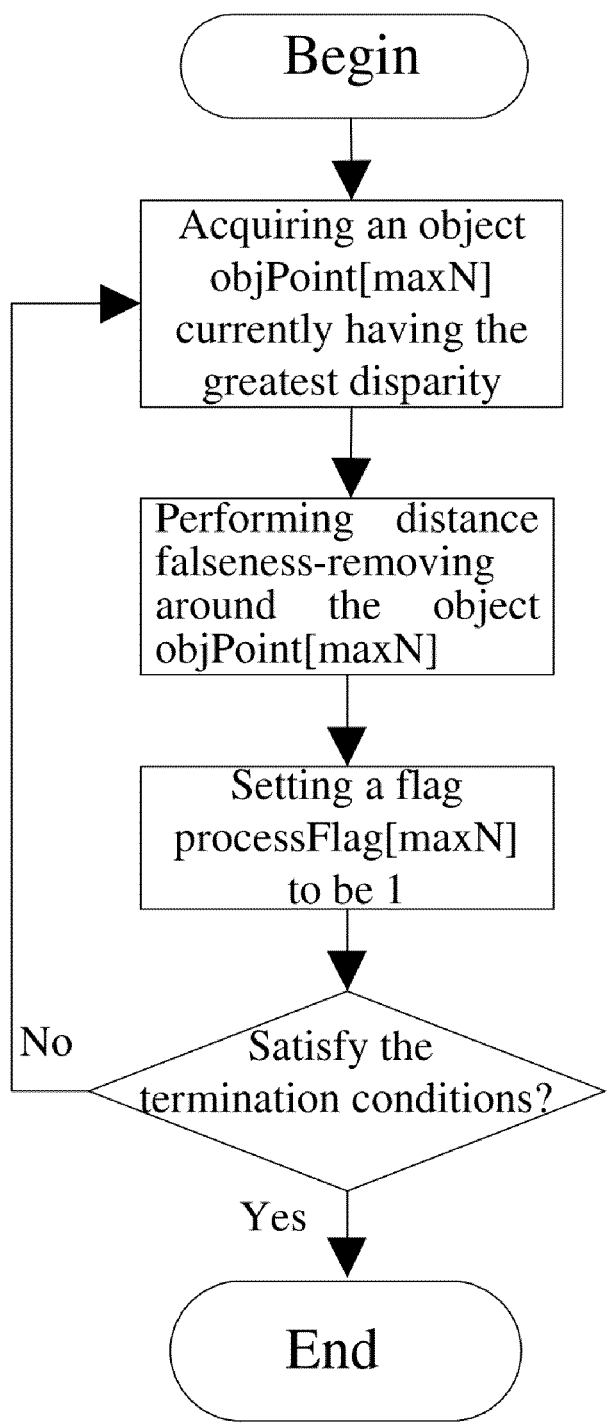
FIG. 6 is a schematic flowchart of an Euclidean distance falseness-removing method according to the second embodiment of the present invention.

Let dstnThreshold represent the distance threshold, and all the object points are subjected to the Euclidean distance falseness-removing process once. As shown in FIG. 6, the detailed steps are as follows:

(1) calculating an average disparity value of each of the initial objects, that has not been subjected to the falseness-removing process, in the predetermined window to find a point that has the greatest average disparity value.

All avgRegion[n] that comply with conditions of deleteFlag[n]=0 and processFlag[n]=0 are traversed to find the maximum value max(avgRegion[n]). A point corresponding to the maximum value is denoted as n=maxN.

(2) Calculating an Euclidean distance dstnVal[n] of the object point objPoint[maxN] from each of the points that haven't been subjected to the distance falseness-removing process, i.e., from each of the points that comply with conditions of deleteFlag[n]=0 and processFlag[n]=0.

If the distance dstnVal[n] of the initial object to be detected is less than the distance threshold dstnThreshold, then this object point objPoint[n] is deleted. That is, deleteFlag[n]=1 and processFlag[n]=1 are set.

(3) setting the flag processFlag[maxN] of the initial object point to be detected that has the present greatest disparity value to be 1.

(4) determining whether flags processFlag[n] of all the object points are 1. If the answer is yes, then the process proceeds to step (5); otherwise, the process proceeds to step (1).

(5) end.

3. Original Image Gray-Scale Information Falseness-Removing Strategy

This strategy takes advantage of the fact that the objects (heads) are generally darker in color (i.e., have a lower gray-scale value). That is, some false objects on the passengers' bodies have much larger gray-scale value than valid objects located on the heads.

From the initial objects, an initial object that has the minimum average gray-scale value within a predetermined window of the matched image centering around the initial object is found, and a ratio of an average gray-scale value of each initial object to the minimum average gray-scale value is calculated. If the ratio corresponding to the initial object to be detected is no greater than a ratio threshold and an average gray-scale value corresponding to the initial object to be detected is no greater than the control threshold, then the initial object to be detected is a valid object; otherwise, the initial object to be detected is a false object.

An average gray-scale value grayVal[n] of each initial object to be detected objPoint[n] within a predetermined window (e.g., a 5×5 window) of the left image (the original image) is obtained, where n represents a serial No. of the initial object point to be detected. Then these grayVal[n] values are traversed to find the minimum value minVal=min(grayVal[n]), against which the gray-scale values of other objects are compared.

Here, to ensure that false objects are removed correctly, the ratio threshold fioThreshold and the control threshold conThreshold are set so that the initial objects to be detected can be recognized by using the two thresholds.

Figure 7:
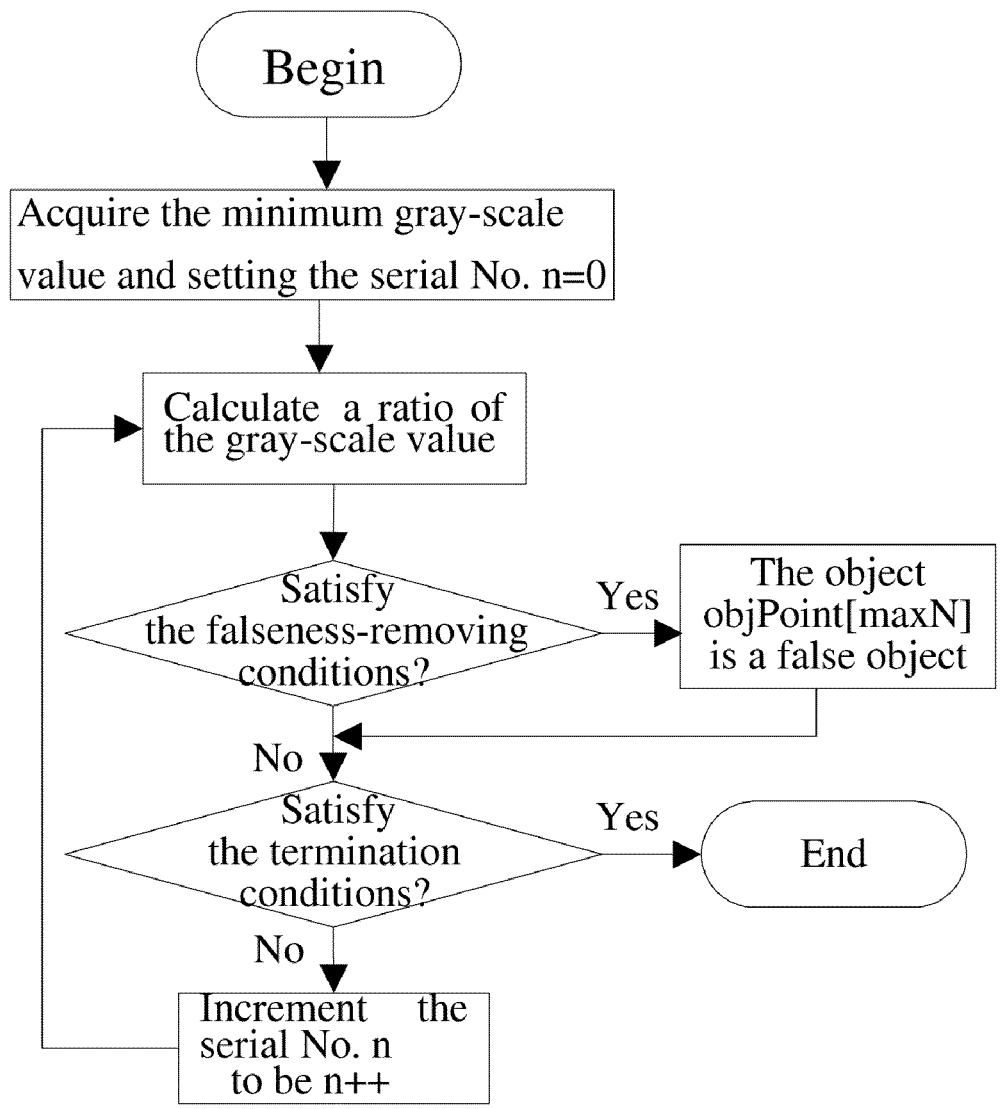
FIG. 7 is a schematic flowchart of a gray-scale information falseness-removing method for an original image according to the second embodiment of the present invention.

Referring to FIG. 7, the original image gray-scale information falseness-removing operation may be performed once through the following steps:

(1) traversing the grayVal[n] values to find the minimum value minVal=min(grayVal[n]), and setting the serial No. to be n=0.

(2) calculating a ratio fioVal[n]=grayVal[n]/minVal. If fioVal[n]>fioThreshold and grayVal[n]>conThreshold, then the object objPoint[n] is a false object and is removed; otherwise, the initial object to be detected is a valid object.

(3) determining whether the termination conditions n=objNum is satisfied, wherein objNum represents the total number of objects to be detected. If it is satisfied, then the process proceeds to step (4); otherwise, n=n+1 and the process proceeds to step (2);

(4) end.

It shall be noted that, the depth information value and the disparity information value are consistent with each other, and both can be used to represent a distance of an object from a video camera. Obviously in the second embodiment of the present invention, from the disparity value obtained, a corresponding depth value may be obtained according to a specific computational relationship, the depth information of the background scene is subtracted from the depth information of the current scene to obtain the object depth information, and the initial object to be detected is determined according to extreme points of the object depth image that corresponds to the object depth information; then valid objects are determined by removing false objects from the initial objects to be detected according to the aforementioned falseness-removing strategy.

Now, the aforementioned falseness-removing strategy will be detailed as follows, and for the detailed processing approaches, reference may be made to the above description of the disparity image information falseness-removing strategy, the Euclidean distance falseness-removing strategy and the original image gray-scale information falseness-removing strategy. The operations comprise:

determining whether an average depth value within a predetermined window of the object depth image centering around each initial object is greater than a depth threshold. If the answer is yes, then the initial object to be detected is a valid object; otherwise, the object to be detected is a false object; and for initial objects to be detected that haven't been subjected to the falseness-removing process, determining an object objPoint[maxN] that has the greatest average depth value within a predetermined window of the object depth image centering around the initial object to be detected, calculating an Euclidean distance of each of the initial objects to be detected from the object objPoint[maxN]; if the Euclidean distance of the initial object to be detected from the object objPoint[maxN] is no less than the distance threshold, then the initial object to be detected is a valid object, and otherwise, the initial object to be detected is a false object, wherein maxN is a serial No. of the object that has the greatest average depth value; and acquiring a minimum average gray-scale value of the initial objects to be detected within a predetermined window of the corresponding image of the current scene centering around the objects, and calculating a ratio of an average gray-scale value of each of the initial objects to be detected to the minimum average gray-scale value; if the ratio corresponding to the initial object to be detected is no greater than the ratio threshold and the average gray-scale value corresponding to the initial object to be detected is no greater than the control threshold, then the initial object to be detected is a valid object, and otherwise, the initial object to be detected is a false object. Here, the corresponding image of the current scene is an original image of the current scene. For instance, when the depth image is obtained from a disparity image of binocular images, the original image is the matched image of the binocular images; in contrast, when the depth image is obtained from a monocular image, the original image is the monocular image.

In the second embodiment of the present invention, an approach of calculating a depth image based on a disparity image is provided, which comprises the following processing.

From Formula (1) below, a depth value in the depth image may be obtained from a disparity value in the disparity image:

$$z=(b \times f)/d \quad (1)$$

wherein, z represents the depth value; b represents a baseline value, which refers to a distance between photocenters of cameras; f represents a focal length of the cameras in unit of pixels; and d represents the disparity value.

The depth value z obtained from Formula (1) represents the distance from an object to a photocenter of the camera. The smaller the depth value, the nearer the distance from the camera; and the larger the depth value, the further the distance from the camera.

Further, the depth value z obtained as described above might be excessively large (e.g., over 255), in which case the result obtained from Formula (1) may be corrected according to Formula (2) below:

$$z1=z \times r \quad (2)$$

wherein, the value of r is determined according to an installation height of the camera, and may be either greater than 1 or less than 1. Through Formula (2), z can be converted into a value ranging from 0 to 255. The depth value z1 thus obtained is inversely proportional to the parallax value d; that is, the brightest portion in the disparity image will become the darkest portion in the depth image, while the darkest portion in the disparity image will become the brightest portion in the depth image.

For purpose of subsequent object locating, it is necessary to keep the correspondence relationship between the depth image and the disparity image consistent. Further, Formula (2) may be corrected as follows:

$$z2=255-z1 \quad (3)$$

z2 thus obtained just composes the final object depth information for use to detect the object.

For the abovementioned object detection and falseness-removing process, the locating site is not merely limited to a specific site of the object (e.g., a head), and more than one falseness-removing strategy may be used for object recognition to remove false objects. In this way, detection of a passenger flow no longer relies on the property of an object that it appears blacker than the surroundings, so an object wearing a hat or black clothes can be detected accurately to give a precise passenger flow detection result.

Figure 8:
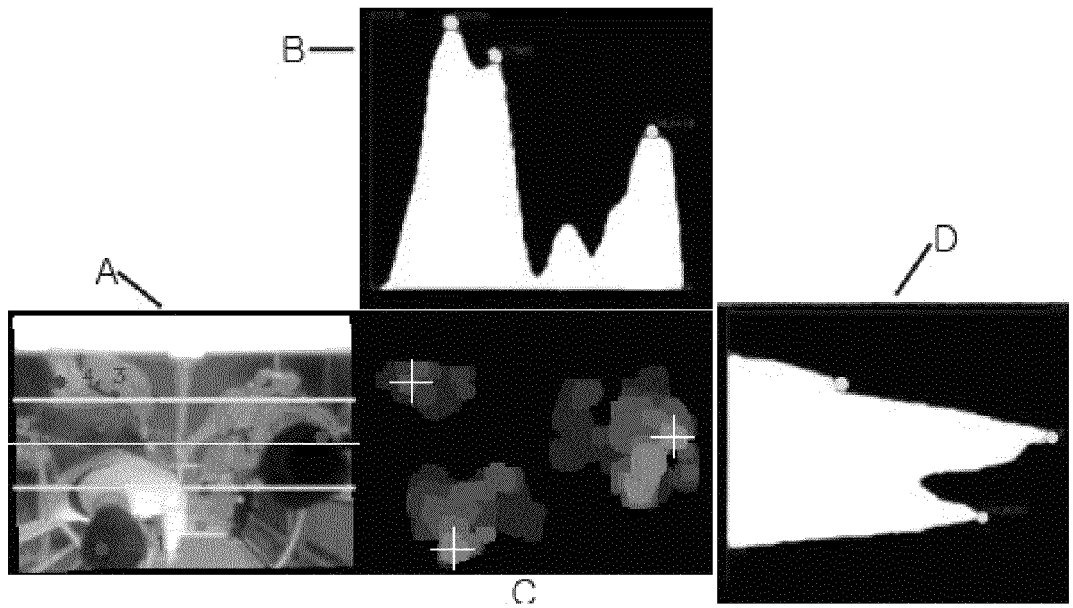
FIG. 8 is a schematic view illustrating experimental results of projection marking results according to the second embodiment of the present invention.

To facilitate understanding of and fully describe the benefits of embodiments of the present invention, a simplified example of the aforesaid object recognition and labeling method will be described. Referring to FIG. 8, this is described still by taking an automatic bus passenger flow statistical system as an example. In FIG. 8, the image A is an image of a real scene.

Firstly, projection of the object disparity image in the horizontal direction is made to transform two-dimensional data of the object disparity image into an image of unidirectional projection, and peak points (i.e., extreme points) are searched in the horizontal projection image; then, projection of the object disparity image in the vertical direction is made to transform two-dimensional data of the object disparity image into an image of unidirectional projection, and peak points are searched in the vertical projection image. In FIG. 8, the image B is the horizontal projection image, in which three peak points as shown by the dots are found; the image D is the vertical projection, in which three peak points as shown by the dots are found. As a result, 3×3=9 initial objects are obtained. Then, by removing false objects from the initial objects according to the falseness-removing strategy, valid objects can be labeled correctly, as shown by the image C in FIG. 8. Through comparison between the image C and the real scene image A, validity and accuracy of the motion detection method provided in the embodiment of the present invention can be well proven.

As can be known from the above description, by taking characteristics of the stereovision technology into account, the technical solution provided in the embodiment of the present invention makes full use of the disparity image of the scene and performs motion detection by use of an object disparity image that contains only disparity of an object to be detected, thus improving accuracy of the detection. The technical solution of this embodiment locates the object by using a stereo matching technology based on key points to acquire the object disparity image accurately, and the locating site is not limited to a specific site of the object. Furthermore, this technical solution recognizes the object and removes false object through several falseness-removing strategies. As has been proven in practice, the technical solution of the present invention can solve the problems of the prior art and effectively overcome the influence imposed by the background and the problem of object "conglutination", thereby avoiding mistakes in detection occurring when the object wears a hat or black clothes and accomplishing object detection in complex scenes with a high precision and a decreased computational complexity.

Hereinbelow, a motion detection method of a third embodiment of the present invention will be described in detail. The third embodiment primarily comprises the following operations: performing an edge detection on images of the background scene or the current scene at a same view point; calculating depth information of the background scene or depth information of the current scene according to the edge detection; and then obtaining object depth information and obtaining the object to be detected according to the object depth information.

For the operations of obtaining the object depth information from the depth information of the background scene and the depth information of the current scene as well as obtaining the object to be detected according to the object depth information, reference may be made to the first and the second embodiments of the present invention. Hereinafter, the operations of performing an edge detection on images of the background scene or the current scene at a same view point; calculating depth information of the background scene or depth information of the current scene according to the edge detection in the third embodiment will be described, which comprises the following two approaches:

The first approach: using a pixel value difference of an image sequence to perform edge detection.

The image sequence includes a first image and a second image. A pixel value of the second image is subtracted from the pixel value of the first image to obtain a pixel value difference $S(x, y, n)$. A pixel value may be either the chrominance $C(x, y, n)$ or the luminance $I(x, y, n)$ of a pixel point, in which $I(x, y, n)$ represents a luminance value of a pixel having coordinates $(x, y)$ at a time point n, and $S(x, y, n)$ represents a chrominance value of the pixel having coordinates $(x, y)$ at the time point n.

To reduce the error, filtering is performed on the pixel value difference $S(x, y, n)$ to derive a pixel value difference signal $S_F(x, y, n)$. By use of the pixel value difference signal $S_F(x, y, n)$ and, optionally, through depth mapping according to the linear or nonlinear transformation shown in Formula (5) or Formula (6) below, depth information $D(x, y, n)$ is obtained:

$$D(x,y,n)=\alpha * S_F(x,y,n) \quad (4)$$

where, $\alpha$ is a predetermined constant;

$$D(x,y,n)=W(i) * S_F(x,y,n) \quad (5)$$

where, $W(i)$ is a weight factor which is related to a spatial distance i of a pixel from another pixel in a neighboring space.

The second approach: using a motion vector difference of an image sequence to perform edge detection.

In this approach, the edge detection is performed on basis of a motion vector field derived from the first image and the second image. The first image and the second image belong to the same video sequence.

A motion vector difference of neighboring motion vectors in this motion vector field is used to perform the edge detection, and a depth value obtained is a function of the motion vector difference; for example, the depth value is assigned according to the weight factor $W(i)$. In this motion vector field, regions with large motion vector contrast are detected, with such regions corresponding to edges of respective images.

By taking characteristics of the stereovision technology into account, the technical solution provided in the embodiment of the present invention makes full use of the depth information of the scene and performs motion detection by use of the object depth information. The technical solution of the present invention can solve the problems of the prior art and effectively overcome the influence imposed by the circumstance and the problem of object "conglutination", thereby avoiding mistakes in detection occurring when the object wears a hat or black clothes and accomplishing object detection in complex scenes with a high precision and a decreased computational complexity.

Figure 9:
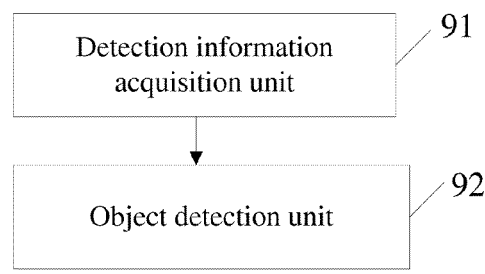
FIG. 9 is a schematic structural view of a motion detection apparatus according to a fourth embodiment of the present invention.

As shown in FIG. 9, a fourth embodiment of the present invention provides a motion detection apparatus, which comprises:

a detection information acquisition unit 91, configured to acquire detection information of a background scene and detection information of a current scene, wherein the current scene is a scene comprising an object(s) to be detected and the same background scene;

an object detection unit 92, configured to calculate the object(s) to be detected according to the detection information of the background scene and the detection information of the current scene.

The object detection unit 92 is further configured to calculate the object to be detected by subtracting the detection information of the background scene from the detection information of the current scene; or the object detection unit 92 is further configured to set a first weight value, a second weight value and a compensation factor, subtract a product of the detection information of the background scene and the second weight value from a product of the detection information of the current scene and the first weight value to obtain initial detection information of the object to be detected, and calculate the object to be detected according to the initial detection information of the object to be detected and the compensation factor.

Figure 10:
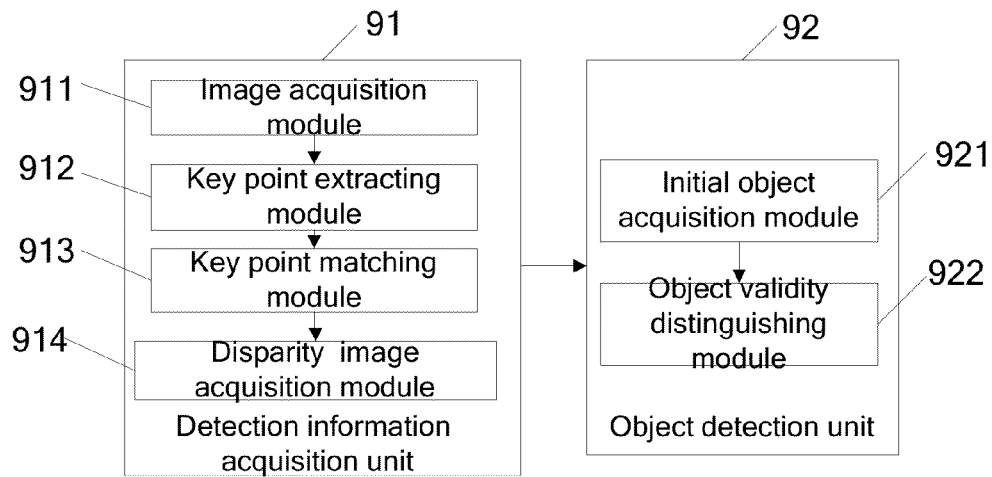
FIG. 10 is a schematic structural view of another motion detection apparatus according to a fourth embodiment of the present invention.

Further, as shown in FIG. 10, the detection information is a disparity image, and the detection information acquisition unit 91 further comprises:

an image acquisition module 911, configured to acquire a first image and a second image of the background scene or the current scene;

a key point extracting module 912, configured to extract key points from the first image and the second image respectively to obtain first image key points and second image key points;

a key point matching module 913, configured to perform stereo matching on the first image key points and the second image key points to obtain a matching point of each of the first image key points in the second image key points; and a disparity image acquisition module 914, configured to calculate a disparity of each of the first image key points and acquire a disparity image of the background scene or the current scene according to the disparity.

The key point matching module 913 is further configured to acquire key points within a predetermined range that starts from a $b^{th}$ column in an $a^{th}$ row of the second image towards the first image, wherein a and b represent a row coordinate and a column coordinate of each of the key points in the first image respectively; calculate matching values of the first image key point (a, b) and key points in the second image corresponding to the first image key point (a, b); and determine a matching point of the first image key point (a, b) in the second image according to the matching values.

The disparity image acquisition module 914 comprises:

a reference point disparity acquisition module, configured to take a scanning point next to the first image key point as a reference point according to a scanning sequence, wherein the key point and the reference point have row coordinates and column coordinates of (a, b) and (a, d) respectively in the first image; acquire a matching point of the reference point within a search range of the second image, wherein the search range is composed of a $(b-DIF)^{th}$ column to a $d^{th}$ column in the $a^{th}$ row, and DIF represents a disparity of the first image key point; and calculate a disparity between the reference point and the matching point of the reference point and take the reference point as a key point; and a non-key point disparity acquisition module, configured to select a neighboring key point (o, p) corresponding to a non-key point (m, n) of the first image; acquire a matching point of the non-key point from a second search range of the second image, wherein the second search range is composed of a (n-DIF)$^{th}$ column to a p$^{th}$ column of a m$^{th}$ row, and DIF represents a disparity of the neighboring key point in the first image; and calculate a disparity between the non-key point and the matching point of the non-key point.

Further, the image acquisition module 911 may be implemented by a binocular video camera, in which case the video camera has to be calibrated.

The purpose of calibrating the video camera is to determine internal parameters of the video camera such as the focal length, the distortion factor of the lens and the uncertainty image factor as well as external parameters such as the rotational matrix, the translation vector, so as to determine an imaging model. Accuracy of the calibrating process has a direct influence on measurement precision of the stereovision system. Through the calibration, on one hand, internal and external parameters of the video camera are obtained and nonlinear distortion of the lens is corrected; and on the other hand, the external baseline is made horizontal.

In this embodiment of the present invention, the binocular video camera used in the motion detection apparatus shall comply with the following requirements:

Two cameras of the same type and with the same parameters are used to ensure consistency of the two cameras; focal planes of the two cameras shall be set to be horizontal and baselines thereof shall be parallel to each other; in order to obtain a large field of view and minimize the image distortion, photosensitive devices (e.g., CMOS or CCD sensors) of the binocular video camera shall have an area of above ⅓ inch; the video camera shall be mounted above the scene to be detected and capture images from above to ensure that the head of the object has the largest depth.

Further, the detection information is a depth image, and the detection information acquisition unit 91 comprises:

a first depth image calculation module, configured to calculate a depth image(s) of the background scene and/or the current scene according to the disparity image(s) of the background scene and/or the current scene acquired; or a second depth image calculation module, configured to perform an edge detection on images of the background scene and/or the current scene captured at a same view point; and calculate the depth image(s) of the background scene and/or the current scene according to the edge detection.

Further, the detection information is a disparity image or a depth image, and the object detection unit 92 comprises: an initial object acquisition module 921, configured to, from the object disparity/depth image calculated according to the detection information of the background scene and the detection information of the current scene, determine an initial object to be detected; and an object validity distinguishing module 922, configured to determine a valid object to be detected by removing false objects from the initial objects to be detected according to a falseness-removing strategy;

wherein, the falseness-removing strategy comprises:

determining whether an average disparity/depth value within a predetermined window of the object disparity/depth image centering around each of the initial objects to be detected is greater than a disparity/depth threshold; if the answer is yes, then the initial object to be detected is a valid object, and otherwise, the initial object to be detected is a false object; and for initial objects to be detected that haven't been subjected to the falseness-removing process, acquiring an object objPoint[maxN] that has the greatest average disparity/depth value within a predetermined window of the object disparity/depth image centering around the initial object to be detected, calculating an Euclidean distance of each of the initial objects to be detected from the object objPoint[maxN]; if the Euclidean distance of the initial object to be detected from the object objPoint[maxN] is no smaller than a distance threshold, then the initial object to be detected is a valid object to be detected, and otherwise, the initial object to be detected is a false object, wherein maxN is a serial No. of the object that has the greatest average disparity/depth value; and acquiring a minimum average gray-scale value of the initial objects to be detected within a predetermined window of the corresponding image of the current scene centering around the objects, and calculating a ratio of an average gray-scale value of each of the initial objects to be detected to the minimum average gray-scale value; if the ratio corresponding to the initial object to be detected is no greater than a ratio threshold and the average gray-scale value corresponding to the initial object to be detected is no greater than a control threshold, then the initial object to be detected is a valid object to be detected, and otherwise, the initial object to be detected is a false object.

If a disparity image is used to detect an object, the corresponding image described above is a matched image when the disparity image is acquired; and if a depth image is used to detect an object, the corresponding image of the current scene is an original image of the current scene. For instance, if the depth image is obtained from a disparity image of binocular images, the original image is the matched image of the binocular images; in contrast, if the depth image is obtained from a monocular image, the original image is the monocular image.

For detailed operations of individual functional modules of the fourth embodiment, reference may be made to the embodiment of the motion detection method of the present invention.

As can be known from the above description, by taking characteristics of the stereovision technology into account, the technical solution provided in this embodiment of the present invention makes full use of the disparity/depth information of the scene and performs motion detection by use of an object disparity/depth image that contains only the object disparity/depth, thus improving accuracy of the detection.

The technical solution of this embodiment locates an object by using a stereo matching technology based on key points to acquire the object disparity image accurately, and the locating site is not limited to a specific site of the object. Furthermore, this technical solution recognizes the object and removes false object through several falseness-removing strategies.

As has been proven in practice, the technical solution of the present invention can solve the problems of the prior art and effectively overcome the influence imposed by the background and the problem of object "conglutination", thereby avoiding mistakes in detection occurring when the object wears a hat or black clothes and accomplishing object detection in complex scenes with a high precision and a decreased computational complexity.

Further, a fifth embodiment of the present invention provides a passenger flow detection system, which comprises a motion detection apparatus and a counter apparatus. The counter apparatus is configured to calculate a passenger flow volume according to objects to be detected that are acquired by the motion detection apparatus. The motion detection apparatus comprises:

a detection information acquisition unit, configured to acquire detection information of a background scene and detection information of a current scene, wherein the current scene comprises an object to be detected and the same background scene; and an object detection unit, configured to calculate the object to be detected according to the detection information of the background scene and the detection information of the current scene.

This system is applicable to automatic passenger flow statistics in transportation systems such as railway systems, metro systems and bus systems, and may also be applied to any cases where moving objects need to be detected. Particularly, this system is applicable to detection and calibration of objects in places where brightness varies greatly.

As can be known from the above description, the technical solutions disclosed by embodiments of the present invention take into account the influence of the original background on the object to be detected, and derive the object to be detected through calculation according to the detection information of the background scene and the detection information of the current scene. This effectively mitigates the influence of the background on detection of the object, resulting in an improved accuracy of detection. As has been proven in practice, the technical solutions disclosed by the embodiments of the present invention can solve the problems of the prior art caused by detecting an object only according to depth information of the scene containing the object to be detected, and effectively overcome the influence imposed by the background and the problem of object "conglutination", thereby accomplishing object detection in complex scenes with a high precision and a decreased computational complexity.

As can be understood by those of ordinary skill in the art, all or some of the steps described in the above embodiments may be accomplished by associated hardware controlled by a program. Software corresponding to the embodiments may be stored in a computer readable storage medium.

What described above are only exemplary embodiments of the present invention. However, scope of the present invention is not merely limited thereto, and any alterations or substitutions that will readily occur to those skilled in the art within the spirit of the present invention still fall within the scope of the present invention. Therefore, the scope of the present invention shall be determined by the claims.

The invention claimed is:

1. A motion detection method, comprising:
   acquiring detection information of a background scene and detection information of a current scene, wherein the current scene is a scene comprising an object(s) to be detected and the same background scene;
   calculating the object(s) to be detected according to the detection information of the background scene and the detection information of the current scene, wherein the detection information is a disparity image or a depth image;
   acquiring extreme points of a horizontal projection and a vertical projection respectively of the object disparity/depth image; and
   pairing the extreme points of the horizontal projection and those of the vertical projection in one-to-one correspondence to determine the initial objects to be detected, wherein the object disparity/depth image is calculated according to the detection information of the background scene and the detection information of the current scene.

2. The motion detection method of claim 1, wherein:
   calculating the object(s) to be detected is accomplished by subtracting the detection information of the background scene from the detection information of the current scene; or
   setting a first weight value, a second weight value and a compensation factor, subtracting a product of the detection information of the background scene and the second weight value from a product of the detection information of the current scene and the first weight value to obtain initial object detection information, and calculating the object(s) to be detected according to the initial object detection information and the compensation factor.

3. The motion detection method of claim 2, wherein the detection information is a disparity image, and the method further comprises:
   acquiring a first image and a second image of the background scene and/or the current scene;
   extracting key points from the first image and the corresponding second image respectively to obtain first image key points and second image key points;
   performing stereo matching on the first image key points and the second image key points to obtain a matching point of each of the first image key points in the second image key points; and
   calculating a disparity of each of the first image key points and acquiring a disparity image of the background scene and/or the current scene according to the disparity.

4. The motion detection method of claim 3, wherein performing stereo matching on the first image key points and the second image key points to obtain a matching point of each of the first image key point in the second image key points comprises:
   acquiring key points within a predetermined range that starts from a $b^{th}$ column in an $a^{th}$ row of the second image towards the first image, wherein a and b represent a row coordinate and a column coordinate of each of the key points in the first image respectively;
   calculating matching values of the first image key point (a, b) and the key points in the second image corresponding to the first image key point (a, b); and
   determining a matching point of the first image key point (a, b) in the second image according to the matching values.

5. The motion detection method of claim 3, wherein calculating a disparity of each of the first image key points and acquiring a disparity image according to the disparity comprises:
   taking a scanning point next to the first image key point as a reference point according to a scanning sequence, wherein the key point and the reference point have row coordinates and column coordinates of (a, b) and (a, d) respectively in the first image;
   acquiring a matching point of the reference point within a search range of the second image, wherein the search range is composed of a $(b-DIF)^{th}$ column to a $d^{th}$ column in the $a^{th}$ row, and DIF represents a disparity of the first image key point; and
   calculating a disparity difference between the reference point and the matching point of the reference point and taking the reference point as a key point.

6. The motion detection method of claim 3, wherein calculating a disparity of each of the first image key points and acquiring a disparity image according to the disparity comprises:
   selecting a neighboring key point (o, p) corresponding to a non-key point (m, n) of the first image;

acquiring a matching point of the non-key point from a second search range of the second image, wherein the second search range is composed of a (n-DIF)$^{th}$ column to a p$^{th}$ column of a m$^{th}$ row, and DIF represents a disparity of the neighboring key point in the first image; and calculating a disparity between the non-key point and the matching point of the non-key point.

7. The motion detection method of claim 3, further comprising:
extracting image edge points from the first image and the second image respectively as the key points, wherein the first image and the second image are binocular images of the scene.

8. The motion detection method of claim 3, further comprising:
performing stereo matching between the first image key point and the second image key point based on the Census criterion; and
acquiring the disparity image according to the disparity of the first image key point and based on the normalized cross correlation criterion.

9. The motion detection method of claim 1, wherein the detection information is a depth image, and the method further comprises:
calculating a depth image(s) of the background scene and/or a depth image(s) of the current scene according to the disparity image(s) of the background scene and/or the disparity image(s) of the current scene acquired; or
performing an edge detection on images of the background scene and/or the current scene captured at a same view point; and
calculating the depth image(s) of the background scene and/or the current scene according to the edge detection.

10. The motion detection method of claim 2, wherein obtaining the object to be detected further comprises:
determining an initial object(s) to be detected; and
determining a valid object(s) to be detected by removing false objects from the initial object(s) to be detected according to a falseness-removing strategy.

11. The motion detection method of claim 10, wherein the falseness-removing strategy comprises:
determining whether an average disparity/depth value within a predetermined window of the object disparity/depth image centering around each of the initial objects to be detected is greater than a disparity/depth threshold, wherein if the answer is yes, then the initial object to be detected is a valid object, and otherwise, the initial object to be detected is a false object;
for initial objects to be detected that haven't been subjected to the falseness-removing process, acquiring an object objPoint[maxN] that has the greatest average disparity/depth value within a predetermined window of the object disparity/depth image centering around the initial object to be detected, calculating an Euclidean distance of each of the initial objects to be detected from the object objPoint[maxN], wherein if the Euclidean distance of the initial object to be detected from the object objPoint[maxN] is no smaller than a distance threshold, then the initial object to be detected is a valid object to be detected, and otherwise, the initial object to be detected is a false object, wherein maxN is a serial No. of the object that has the greatest average disparity/depth value; and
acquiring a minimum average gray-scale value of the initial objects to be detected within a predetermined window of the corresponding image of the current scene centering around the objects, and calculating a ratio of an average gray-scale value of each of the initial objects to be detected to the minimum average gray-scale value, wherein if the ratio corresponding to the initial object to be detected is no greater than a ratio threshold and the average gray-scale value corresponding to the initial object to be detected is no greater than a control threshold, then the initial object to be detected is a valid object to be detected, and otherwise, the initial object to be detected is a false object.

12. A motion detection apparatus, comprising:
a detection information acquisition unit, configured to acquire detection information of a background scene and detection information of a current scene, wherein the current scene is a scene comprising an object(s) to be detected and the same background scene;
an object detection unit, configured to calculate the object(s) to be detected according to the detection information of the background scene and the detection information of the current scene;
wherein the detection information is a disparity image or a depth image and the object detection unit comprises:
an initial object acquisition module, configured to, from the object disparity/depth image calculated according to the detection information of the background scene and the detection information of the current scene, determine an initial object(s) to be detected; and
an object validity distinguishing module, configured to determine a valid object(s) to be detected by removing false objects from the initial objects to be detected according to a falseness-removing strategy,
wherein, the falseness-removing strategy comprises:
determining whether an average disparity/depth value within a predetermined window of the object disparity/depth image centering around each of the initial objects to be detected is greater than a disparity/depth threshold, wherein if the answer is yes, then the initial object to be detected is a valid object, and otherwise, the initial object to be detected is a false object;
for initial objects to be detected that haven't been subjected to the falseness-removing process, acquiring an object objPoint[maxN] that has the greatest average disparity/depth value within a predetermined window of the object disparity/depth image centering around the initial object to be detected, calculating an Euclidean distance of each of the initial objects to be detected from the object objPoint[maxN], wherein if the Euclidean distance of the initial object to be detected from the object objPoint[maxN] is no smaller than a distance threshold, then the initial object to be detected is a valid object to be detected, and otherwise, the initial object to be detected is a false object, wherein maxN is a serial No. of the object that has the greatest average disparity/depth value; and
acquiring a minimum average gray-scale value of the initial objects to be detected within a predetermined window of the corresponding image of the current scene centering around the objects, and calculating a ratio of an average gray-scale value of each of the initial objects to be detected to the minimum average gray-scale value; if the ratio corresponding to the initial object to be detected is no greater than a ratio threshold and the average gray-scale value corresponding to the initial object to be detected is no greater than a control threshold, then the initial object to be detected is a valid object to be detected, and otherwise, the initial object to be detected is a false object.

13. The motion detection apparatus of claim 12, wherein:
the object detection unit is further configured to calculate the object(s) to be detected by subtracting the detection information of the background scene from the detection information of the current scene; or
the object detection unit is further configured to set a first weight value, a second weight value and a compensation factor, subtract a product of the detection information of the background scene and the second weight value from a product of the detection information of the current scene and the first weight value to obtain initial detection information of the object to be detected, and calculate the object(s) to be detected according to the initial detection information of the object to be detected and the compensation factor.

14. The motion detection apparatus of claim 12, wherein the detection information is a disparity image, and the detection information acquisition unit further comprises:
an image acquisition module, configured to acquire a first image and a second image of the background scene or the current scene;
a key point extracting module, configured to extract key points from the first image and the second image respectively to obtain first image key points and second image key points;
a key point matching module, configured to perform stereo matching on the first image key points and the second image key points to obtain a matching point of each of the first image key points in the second image key points; and
a disparity image acquisition module, configured to calculate a disparity of each of the first image key points and acquire a disparity image of the background scene or the current scene according to the disparity.

15. The motion detection apparatus of claim 12, wherein the detection information is a depth image, and the detection information acquisition unit comprises:
a first depth image calculation module, configured to calculate a depth image(s) of the background scene and/or the current scene according to the disparity image(s) of the background scene and/or the current scene acquired; or
a second depth image calculation module, configured to perform an edge detection on images of the background scene and/or the current scene captured at a same view point, and calculate the depth image(s) of the background scene and/or the current scene according to the edge detection.

16. The motion detection apparatus of claim 14, wherein the key point matching module is further configured to acquire key points within a predetermined range that starts from a $b^{th}$ column in an $a^{th}$ row of the second image towards the first image, wherein a and b represent a row coordinate and a column coordinate of each of the key points in the first image respectively; calculate matching values of the first image key point (a, b) and key points in the second image corresponding to the first image key point (a, b); and determine a matching point of the first image key point (a, b) in the second image according to the matching values.

17. The motion detection apparatus of claim 14, wherein the disparity image acquisition module comprises:
a reference point disparity acquisition module, configured to take a scanning point next to the first image key point as a reference point according to a scanning sequence, wherein the key point and the reference point have row coordinates and column coordinates of (a, b) and (a, d) respectively in the first image; acquire a matching point of the reference point within a search range of the second image, wherein the search range is composed of a $(b-DIF)^{th}$ column to a $d^{th}$ column in the $a^{th}$ row, and DIF represents a disparity of the first image key point; and calculate a disparity between the reference point and the matching point of the reference point and take the reference point as a key point; and
a non-key point disparity acquisition module, configured to select a neighboring key point (o, p) corresponding to a non-key point (m, n) of the first image; acquire a matching point of the non-key point from a second search range of the second image, wherein the second search range is composed of a $(n-DIF)^{th}$ column to a $p^{th}$ column of a $m^{th}$ row, and DIF represents a disparity of the neighboring key point in the first image; and calculate a disparity between the non-key point and the matching point of the non-key point.

18. A passenger flow detection system comprising a motion detection apparatus and a counter apparatus, the counter apparatus being configured to calculate a passenger flow volume according to objects to be detected that are acquired by the motion detection apparatus, wherein,
the motion detection apparatus comprises:
a detection information acquisition unit, configured to acquire detection information of a background scene and detection information of a current scene, wherein the current scene comprises an object(s) to be detected and the same background scene; and
an object detection unit, configured to calculate the object(s) to be detected according to the detection information of the background scene and the detection information of the current scene;
wherein the detection information is a disparity image or a depth image, and the object detection unit comprises:
an initial object acquisition module, configured to, from the object disparity/depth image calculated according to the detection information of the background scene and the detection information of the current scene, determine an initial object(s) to be detected; and
an object validity distinguishing module, configured to determine a valid object(s) to be detected by removing false objects from the initial objects to be detected according to a falseness-removing strategy,
wherein, the falseness-removing strategy comprises:
determining whether an average disparity/depth value within a predetermined window of the object disparity/depth image centering around each of the initial objects to be detected is greater than a disparity/depth threshold, wherein if the answer is yes, then the initial object to be detected is a valid object, and otherwise, the initial object to be detected is a false object;
for initial objects to be detected that haven't been subjected to the falseness-removing process, acquiring an object objPoint[maxN] that has the greatest average disparity/depth value within a predetermined window of the object disparity/depth image centering around the initial object to be detected, calculating an Euclidean distance of each of the initial objects to be detected from the object objPoint[maxN], wherein if the Euclidean distance of the initial object to be detected from the object objPoint[maxN] is no smaller than a distance threshold, then the initial object to be detected is a valid object to be detected, and otherwise, the initial object to be detected is a false object, wherein maxN is a serial No. of the object that has the greatest average disparity/depth value; and acquiring a minimum average gray-scale value of the initial objects to be detected within a predetermined window of the corresponding image of the current scene centering around the objects, and calculating a ratio of an average gray-scale value of each of the initial objects to be detected to the minimum average gray-scale value; if the ratio corresponding to the initial object to be detected is no greater than a ratio threshold and the average gray-scale value corresponding to the initial object to be detected is no greater than a control threshold, then the initial object to be detected is a valid object to be detected, and otherwise, the initial object to be detected is a false object.

* * * * *